US009348484B2

(12) United States Patent
Costenaro et al.

(10) Patent No.: US 9,348,484 B2
(45) Date of Patent: May 24, 2016

(54) DOCKING AND UNDOCKING DYNAMIC NAVIGATION BAR FOR EXPANDED COMMUNICATION SERVICE

(75) Inventors: Daniel Costenaro, Bellevue, WA (US);
Elizabeth Holz, Seattle, WA (US);
Alessio Roic, Seattle, WA (US);
Jedidiah Brown, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 678 days.

(21) Appl. No.: 13/314,721

(22) Filed: Dec. 8, 2011

(65) Prior Publication Data
US 2013/0152007 A1 Jun. 13, 2013

(51) Int. Cl.
G06F 3/0482 (2013.01)
G06F 3/0481 (2013.01)

(52) U.S. Cl.
CPC .................................... G06F 3/0481 (2013.01)

(58) Field of Classification Search
CPC ............ H04N 21/4316; H04N 21/488; G06F 11/324; G06F 17/212; G06F 17/211
USPC .................................................. 715/711, 715
See application file for complete search history.

(56) References Cited

U.S. PATENT DOCUMENTS

| 6,538,671 | B1 * | 3/2003 | Hall et al. .................... 715/781 |
| 7,100,119 | B2 * | 8/2006 | Keely .................... G06F 3/0483 715/776 |
| 7,810,042 | B2 | 10/2010 | Keely et al. |
| 7,984,384 | B2 | 7/2011 | Chaudhri et al. |
| 2003/0210274 | A1 * | 11/2003 | Subramanian et al. ....... 345/809 |
| 2004/0039779 | A1 | 2/2004 | Amstrong et al. |
| 2004/0085364 | A1 * | 5/2004 | Keely .................... G06F 3/0483 715/804 |
| 2004/0205514 | A1 | 10/2004 | Sommerer et al. |
| 2005/0210412 | A1 | 9/2005 | Matthews et al. |
| 2006/0095424 | A1 | 5/2006 | Petropoulos et al. |

(Continued)

FOREIGN PATENT DOCUMENTS

| CN | 101273327 A | 9/2008 |
| CN | 102239491 A | 11/2011 |
| WO | 2007038090 A | 4/2007 |

OTHER PUBLICATIONS

"Features new to Windows 7", Retrieved at <<http://en.wikipedia.org/wiki/Features_new_to_Windows_7>>, Retrieved Date: Nov. 21, 2011, pp. 23.

(Continued)

Primary Examiner — Namitha Pillai
(74) Attorney, Agent, or Firm — Damon Rieth; Jim Ross; Micky Minhas

(57) ABSTRACT

A navigation bar is provided for switching between modules within an expanded communication service such as email, calendar, contacts, tasks, etc. and for providing preview peeks associated with each module to a user. A temporary preview of a module may be provided upon a hover action over pre-defined navigation bar locations such as icons and/or textual identifiers without actually needing to switch to a module. One or more preview panes may be docked or pinned to a dynamically selected or user defined location on the main user interface so that they are permanently displayed within the main user interface. Users may be enabled to undock one or more of the docked preview panes through a user interface control. New or interesting activity within each module may be highlighted by displaying an information badge next to a module name, for example.

19 Claims, 12 Drawing Sheets

(56) References Cited

U.S. PATENT DOCUMENTS

| | | | |
|---|---|---|---|
| 2007/0050252 A1 | 3/2007 | Jain | |
| 2007/0266336 A1 | 11/2007 | Nojima et al. | |
| 2009/0319929 A1 | 12/2009 | Wang et al. | |
| 2010/0223664 A1* | 9/2010 | Naranjo et al. | 726/10 |
| 2011/0010656 A1 | 1/2011 | Mokotov | |
| 2012/0329441 A1* | 12/2012 | Tseng | 455/418 |

OTHER PUBLICATIONS

"International Search Report", Mailed Date: Mar. 4, 2013, Application No. PCT/US2012/066690, Filed Date: Nov. 28, 2012, pp. 9.

"NUIT Support Center, Outlook Web Application (OWA) Basic Training", Retrieved at <<http://www.it.nortwestern.edu/collaborate/how-to/owa-basic-training.html>>, Nov. 7, 2011, pp. 23.

"Supplementary Search Report Issued in European Patent Application No. 12854703.1", Mailed Date: Jun. 16, 2015, 7 Pages.

"First Office Action and Search Report Issued in Chinese Patent Application No. 201210526003.X", Mailed Date: Feb. 28, 2015, 16 Pages.

Second Office Action Received for China Patent Application No. 201210526003.X, Mailed Date: Nov. 3, 2015, 6 Pages.

* cited by examiner

DOCKING AND UNDOCKING DYNAMIC NAVIGATION BAR FOR EXPANDED COMMUNICATION SERVICE

BACKGROUND

With the proliferation of computing and networking technologies, capabilities and features of software applications have increased in breadth and depth. Locally installed applications providing a single tool are increasingly replaced by hosted services that combine multiple interrelated capabilities. Outlook® form Microsoft Corporation of Redmond, Wash. is an example of such a suite of tools. Available in locally installed or hosted service versions, this program enables users to interact via email or text messaging, schedule appointments and meetings, manage tasks and/or contacts, and perform comparable actions. The services provided by such a program are interrelated in many aspects. For example, email and text messaging (as well as meeting scheduling) services may be associated with contacts of a user, scheduled meetings may be forwarded to others via email, and so on.

A software program (or service) such as Outlook® provides a multitude of features and capabilities for each of the services it includes. These features and capabilities are compounded when the number of tools provided by the program increases. A result of this compounding is the increasing complexity of the user interface making navigation for the user more difficult. While menus and different user interfaces enable a user to navigate through individual aspects of the program, combined user interfaces leave room for improvement of user experience.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a navigation bar for switching between modules within an expanded communication service such as email, calendar, contacts, tasks, etc. and for providing preview peeks associated with each module to a user. According to some embodiments, a temporary preview of a module may be provided upon a hover action over predefined navigation bar locations such as icons and/or textual identifiers without actually needing to switch to a module. One or more preview panes may be docked or pinned to a dynamically selected or user defined location on the main user interface so that they are permanently displayed within the main user interface. Users may be enabled to undock one or more of the docked preview panes through a user interface control. New or interesting activity within each module may be highlighted by displaying an information badge next to a module name, for example.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
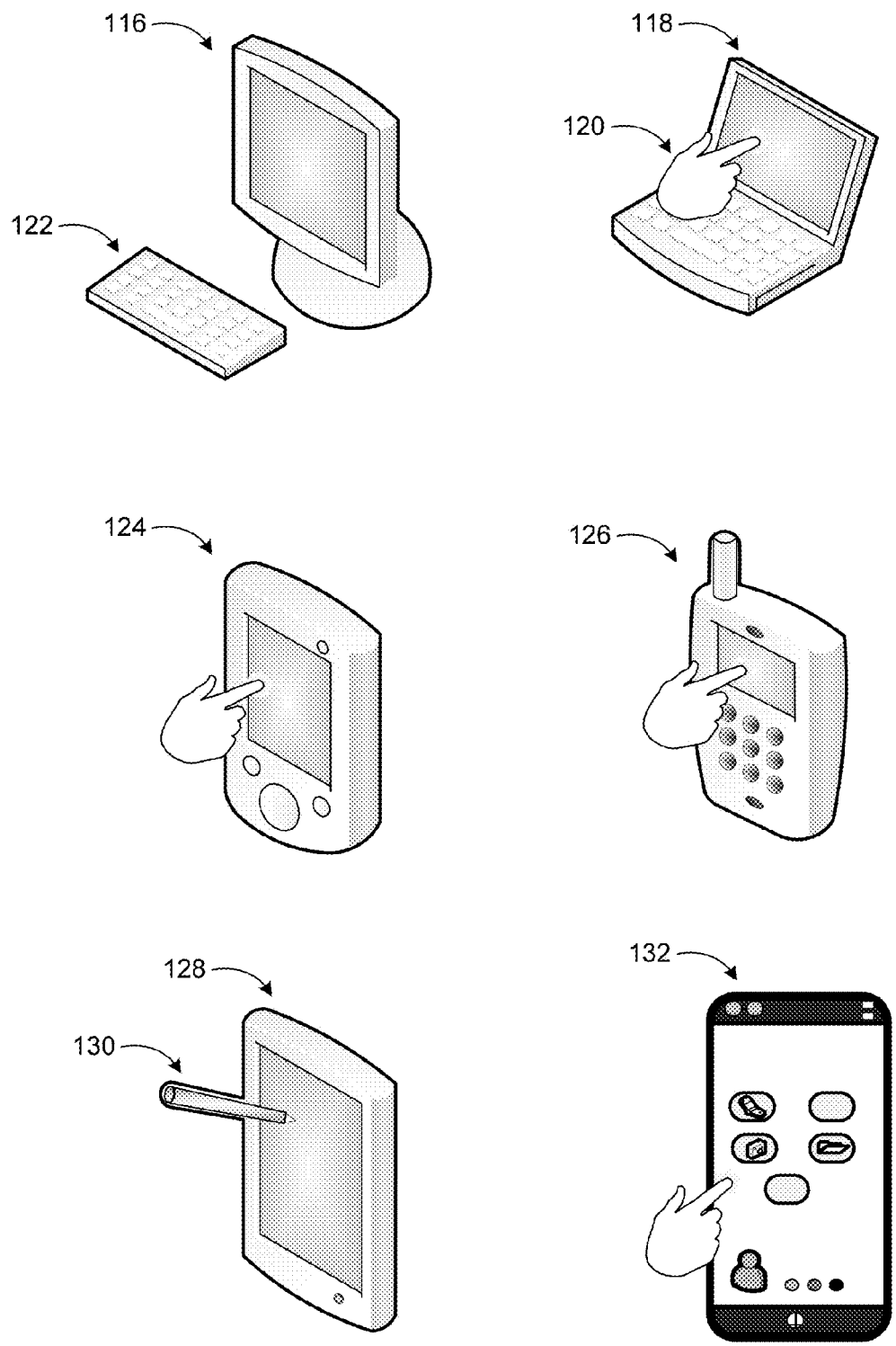
FIG. 1 illustrates some example devices, where a dynamic navigation bar for an expanded communication service may be employed.

As briefly described above, a dynamic navigation bar may be provided in conjunction with an expanded communication service for email, text messaging, scheduling, task management, contact management, and similar services. Preview panes, which are temporarily displayed in response to a hover action on a navigation bar item may be docked at a dynamically selected or user defined location on the user interface for permanent display and undocked when the user wishes to do so.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

An expanded communication service as used herein refers to a hosted service, an enterprise service, or a locally installed application that provides services such as email communications, text message exchange, calendar functionality, task management, contact management, and similar functionality. Such a service may include a number of integrate modules for individual services or some modules may provide multiple services. A main user interface may enable users to interact with the service receiving notifications, viewing different items, providing input for various functions, etc. As discussed below, a variety of devices may be used to execute such a service and different interactions mechanisms such as touch, gesture, voice, gyroscopic input through a finger, a pen, a mouse, or similar device, as well as through predefined keyboard entry combinations may be employed.

FIG. 1 illustrates some example devices, where a dynamic navigation bar for an expanded communication service may be employed. An expanded communication service according to embodiments may be provided in a server-client architecture, as a cloud-based service, or as a locally installed application as discussed above. Thus, a variety of devices may be used to present the user interface to users. In addition to different computing devices, consumer electronics (e.g., TV consoles), personal digital assistants (PDAs), mobile phones, digital media and music players, hand-held game consoles, calculators, and computer peripherals may also be used.

Portable devices, many of which employ touch or gesture based input, tend to have smaller screen size, which means less available space for user interfaces. For example, in a user interface that enables editing of a document (text and/or graphics), in addition to the presented portion of the document, a virtual keyboard may have to be displayed further limiting the available space ("real estate"). Thus, in such scenarios, providing a full user interface for a multi-faceted communication service may be impractical or confusing to users.

Referring to FIG. 1, some example devices are illustrated, where a dynamic navigation bar saving valuable screen real estate while enabling efficient display of information associated with different embodiments may be provided according to embodiments. Embodiments may be implemented in other devices as well, with varying form factors and capabilities.

FIG. 1 includes several example devices such as computer monitor 116, touch enabled (120) laptop computer 118, hand-held computer 124, smart phone 126, tablet computer (or slate) 128, and mobile computing device 132, which may be used for computing, communication, control, measurement, and a number of other purposes. Some of the example devices in FIG. 1 are shown with touch activation 120. However, any of these and other example devices may also employ gesture enabled activation. In addition, tools such as pen 130 may be used to provide touch input. A dynamic navigation bar and associated previews may be controlled also through conventional methods such as a mouse input or input through a keyboard 122.

Figure 2:
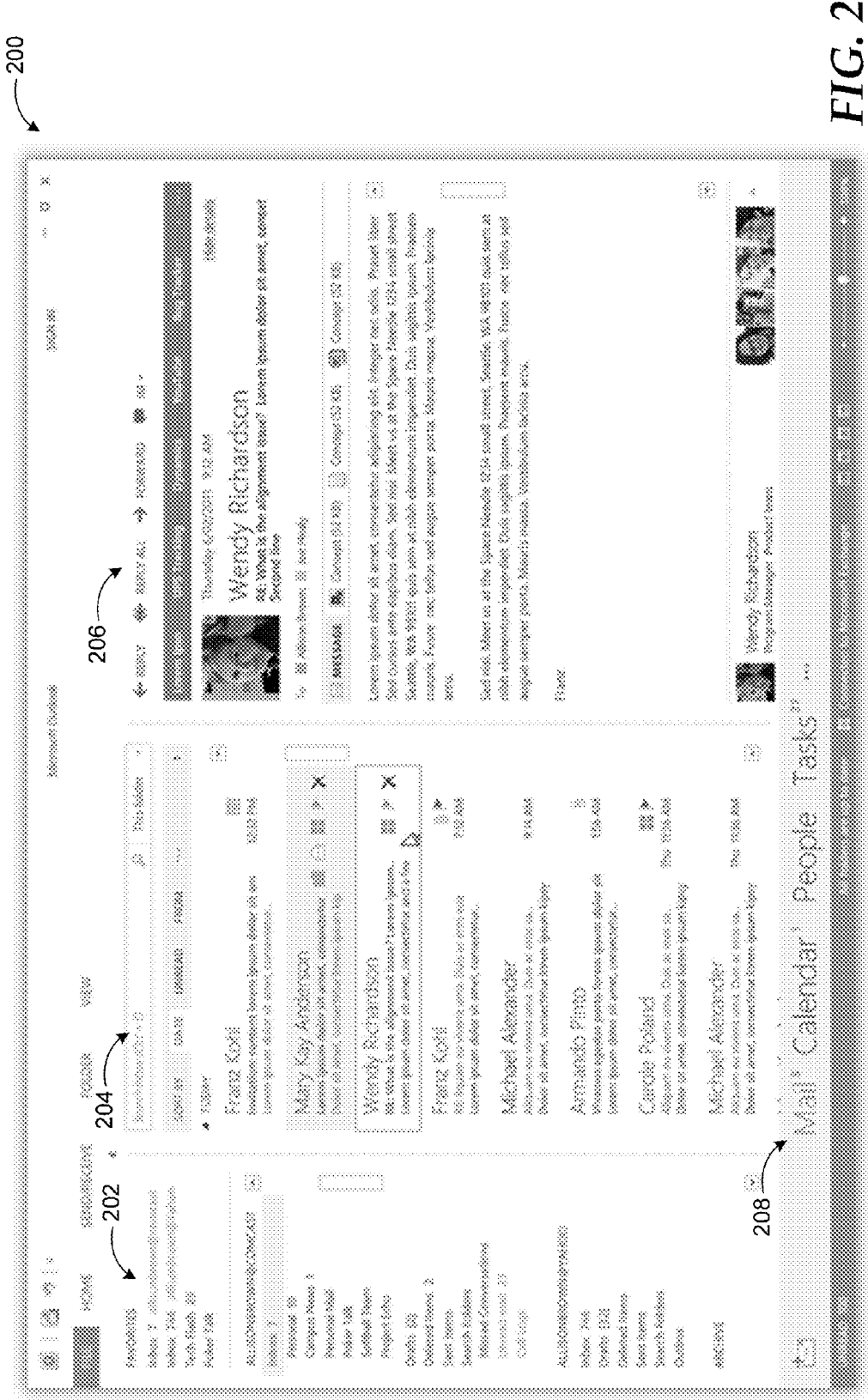
FIG. 2 illustrates a screenshot of a main user interface for an example expanded communication service with a dynamic navigation bar according to embodiments.

FIG. 2 illustrates a screenshot of a main user interface for an example expanded communication service with a dynamic navigation bar according to embodiments. The example user interface in screenshot 200 display information associated with an email module of an expanded communication service. The information includes a listing of folders 202 and a listing of emails 204 in a selected folder. A third viewing pane on the user interface displays a selected email 206.

In addition to email, the expanded communication service may provide text messaging, scheduling, task management, contact management, and similar functionality. In conventional user interfaces, a user may be enabled to switch between modules providing different functionalities by selecting a menu item or comparable control element. However, switching between modules also results in an interruption of user experience. When the user changes views from email to calendar for example, the information associated with email is no longer available, and vice versa. Thus, the user does not have the ability to check on another module while continuing to view one module without interruption. Some applications may enable a user to view multiple modules on the same user interface, but due to display area limitations, either the displayed views may be limited or the user interface may include too much information and become confusing to navigate for the user.

According to some embodiments, a textual, graphic, or combination navigation bar 208 may be provided on the user interface enabling the user to switch between different modules and view a preview of another module without leaving the current view of the user interface. To preserve valuable display area, the navigation bar 208 may be dynamically placed on a location on the user interface without taking up space from other displayed items such as the bottom (as shown in the figure), either side, top, or comparable location.

Keyboard, mouse, touch, gesture, pen input, voice commands are some example input mechanisms that may be used in conjunction with the navigation bar (and user interface). Other example input mechanisms may include, but are not limited to, accelerometer or orientation sensor based input, optically captured gestures, time-based input, proximity to other devices/people/places, and the like. In some embodiments, the navigation bar may also be presented and/or moved along a left side, a right side, a top, or a bottom of the user interface based on one or more of a left or right handedness of a user, a size of fingers (in touch-based devices), a size of tap action pointer associated with a pointing device, a user credential, an ergonomic characteristic of the computing device, and a location attribute comprising one or more of a language selection for the user interface, geographic location information, time zone information, and/or country information. If the size of the user interface changes (e.g., a change in display or opening of another user interface on the screen, etc.), then the navigation bar 208 may be moved and/or resized.

In some embodiments, a layout of the items displayed on the navigation bar 208 may be arranged and rearranged automatically based on above listed or other factors. A number of schemes may be employed to enhance the effectiveness of the navigation bar 208 such as a color scheme, a graphical scheme, a shading scheme, and comparable ones. For example, the items may be displayed in dark and/or light formats, which may be used interchangeably depending on a background color.

Figure 3:
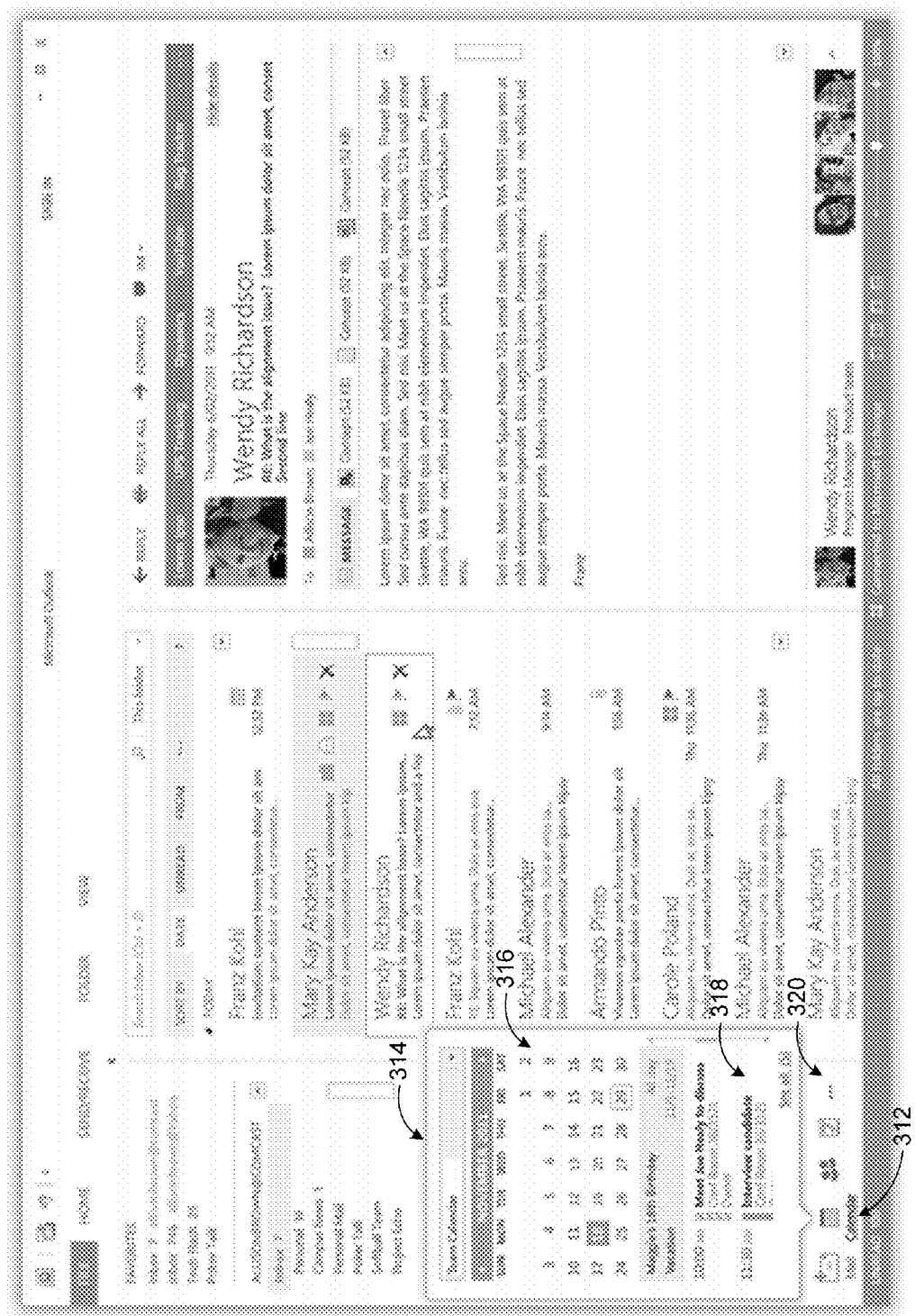
FIG. 3 illustrates the example main user interface of FIG. 2 with the navigation bar in a minimized state and a calendar preview being presented from the navigation bar.

FIG. 3 illustrates the example main user interface of FIG. 2 with the navigation bar in a minimized state and a calendar preview being presented from the navigation bar. As discussed previously, items on a navigation bar may be textual, graphic (e.g., icons), or a combination of both. Icon-based navigation bar may lend itself to be displayed in smaller size, thus saving display area.

The screenshot 300 in FIG. 3 displays the user interface in FIG. 2, where the text-based navigation bar at the bottom of the user interface is replaced with an icon-based, minimized state navigation bar 320. Minimized state navigation bar 320 may include icons only or combination of icons and text. In some embodiments, a textual tip may be displayed adjacent to an icon upon user selection (or hover action). Alternatively, some icons may include a textual tip while others do not (e.g., those commonly known).

Another aspect of a navigation bar according to embodiments is the preview feature. To enable a user to get a preview of a module without leaving currently displayed module, a preview pane 324 may be displayed temporarily in response to a hover action on one of the items of the navigation bar. In the screenshot 300, a calendar preview pane 324 is displayed in response to the user hovering over the calendar item 322 in minimized state navigation bar 320. The calendar preview pane may include a summary view of the user's calendar 326 (e.g., month, week, day, etc.) and a summary 328 listing of some of the items (e.g., appointments) on the calendar.

The preview pane 324 may enable limited interaction for the user. For example, the user may be enabled to select one of the displayed summary items and view more details on that item. The information displayed on a preview pane may be automatically determined based on default parameters, learned from user behavior, manually configurable by the user, or obtained from other applications associated with the user. Moreover, the display and removal of the preview pane may be in an animated fashion. An extent of the interaction may also be pre-defined.

In some embodiments, a design of the preview pane may be selected such that consistency is provided across different devices/applications. For example, the preview pane for a desktop user interface may be same as or similar to the user interface for that module on a handheld device user interface (e.g., a smart phone), thereby providing the user with a consistent look and feel across devices.

Figure 4:
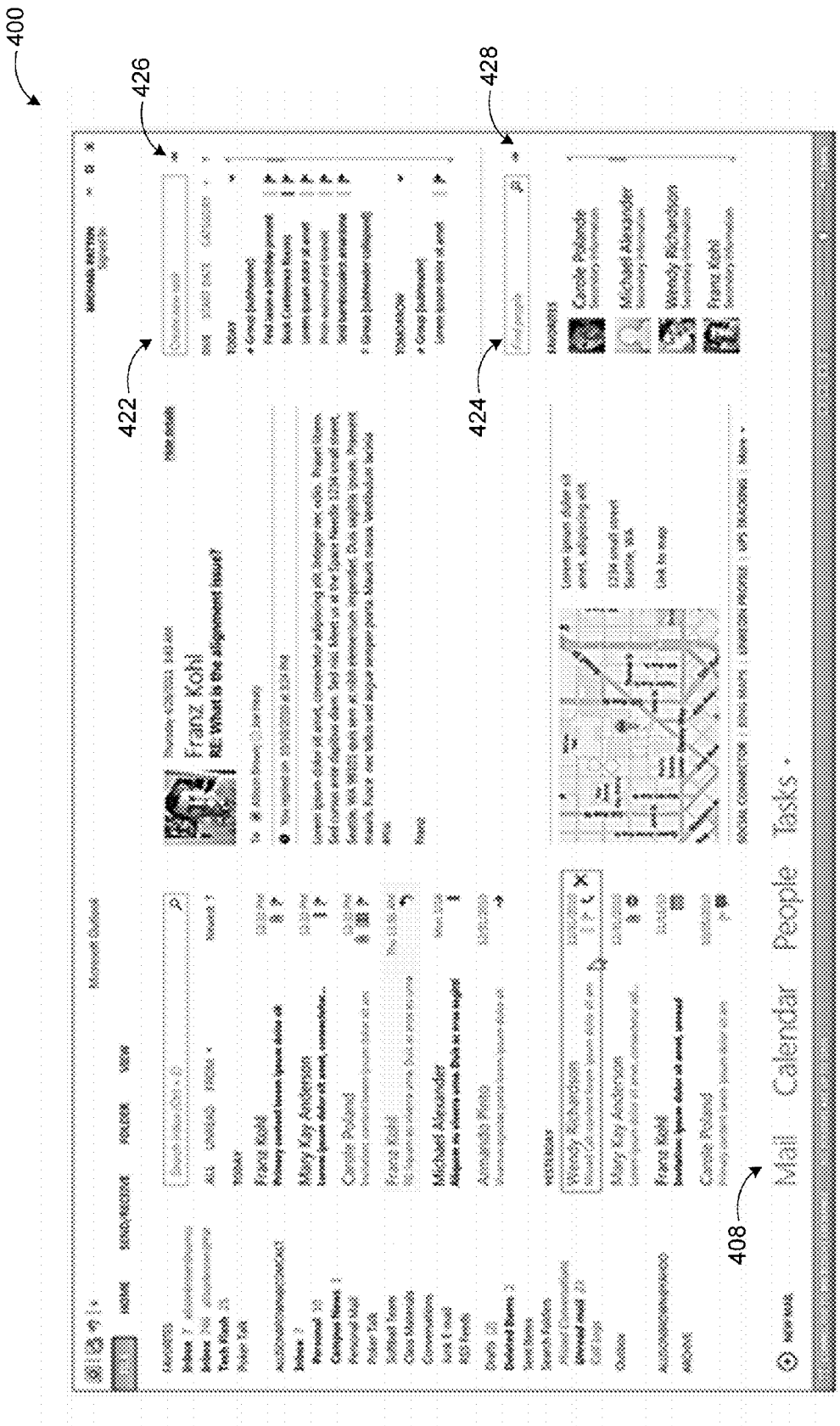
FIG. 4 illustrates the example main user interface of FIG. 2 with two preview panes docked at a right side of the user interface.

FIG. 4 illustrates the example main user interface of FIG. 2 with two preview panes docked at a right side of the user interface. Upon detecting a hover or similar action on the navigation bar 408, the application underlying the user interface on screenshot 400 may display a temporary preview pane associated with the item of interest as discussed above. A textual or graphical control element 426, 428 on the temporarily displayed preview pane may enable a user to dock or pin the preview pane 422 to a predefined or dynamically selected location on the user interface.

A location of the preview pane docking may be determined based on user interface context, available display area, content of the user interface, application type, device type, user credentials, and/or comparable factors. The user may also be enabled to select the location to dock the preview pane. The user may also be enabled to pin multiple preview panes 422, 424. The location, size, and content of pinned preview panes may be adjusted automatically as additional preview panes are docked or undocked. The functionality of the control element for enabling docking of a preview pane may be changed to undocking once the preview pane is docked. Alternatively, a different control element may be provided for undocking a docked preview pane.

Figure 5:
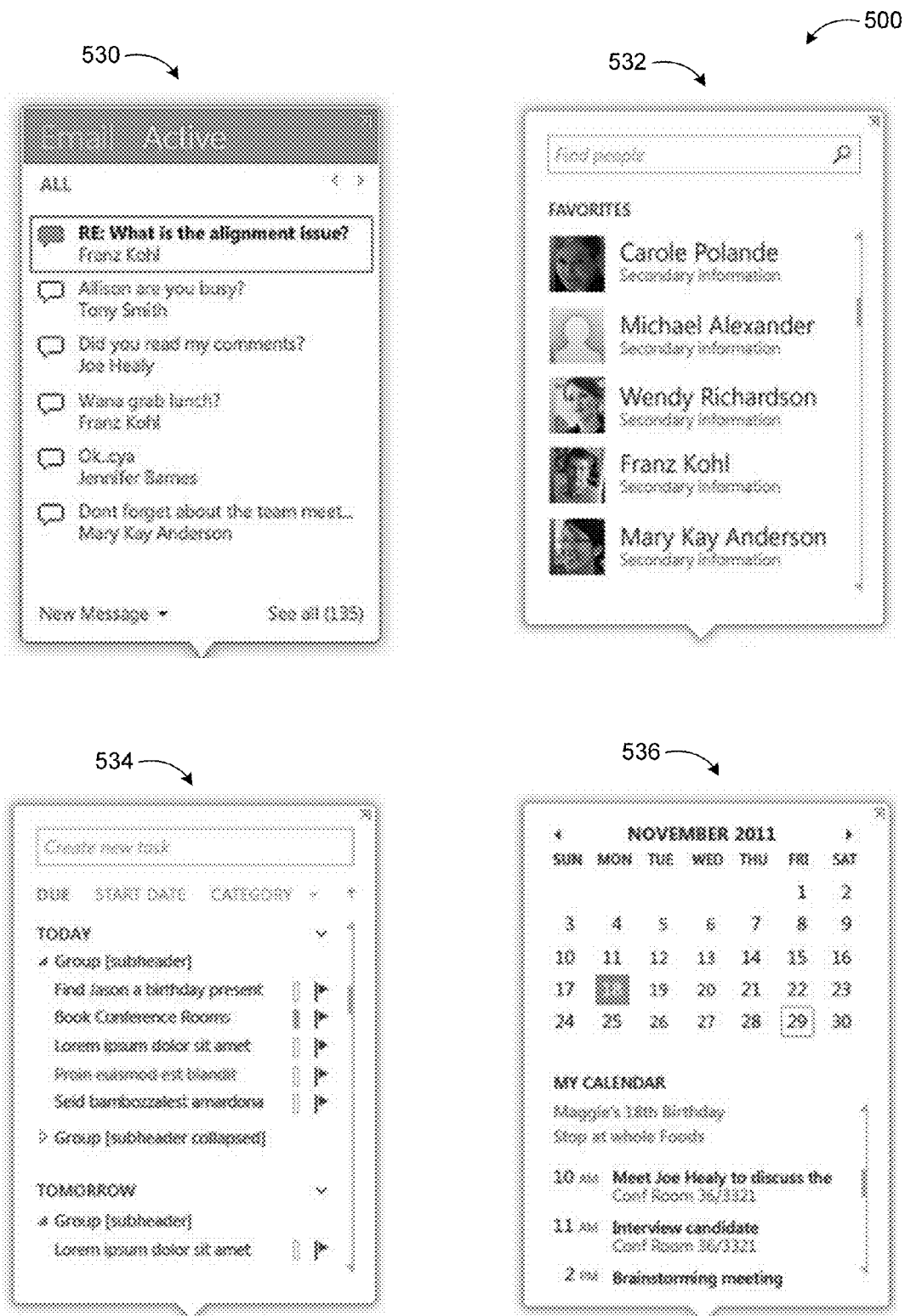
FIG. 5 illustrates example preview types of different modules associated with a navigation bar according to embodiments.

FIG. 5 illustrates example preview types of different modules associated with a navigation bar according to embodiments. The content of the preview panes may be determined automatically (e.g., through machine learning, usage history, retrieving information from other applications, etc.) and/or user configurable.

The preview panes shown in diagram 500 are example preview panes for illustration purposes. As discussed previously, a navigation bar according to embodiments may be extensible and include items representing a number of default or added modules. Thus, preview panes associated with each of the items on the navigation bar may be provided. For example, productivity or customer relationship management (CRM) functionality modules may be added to an expanded communication service along with associated navigation bar items and preview panes.

Each preview pane may provide summary information related to the associated module with limited interaction for the user. For example, an email preview pane 530 may list a number of emails (e.g., top few, newest few, etc.) and enable the user to open, delete, mark the listed items or start a new email. Which items are to be listed may be automatically determined and/or user configurable. A contacts preview pane 532 may display summary contact information for favorite contacts, most recent contacts, etc. A task list preview pane 534 may display a summary listing of some of the tasks chronologically or otherwise and enable the user to mark the tasks as completed, important, etc. Calendar preview pane 536 may display a summary calendar (month, week, day, etc.) and a listing of a number of most important, newest, current, etc. calendar items (appointments, meetings, etc.).

While the listing of items (emails, calendar items, tasks, contacts, etc.) may be limited to the available space on the preview pane, additional items may also be displayed through the use of a scroll bar or similar mechanism. In some embodiments, the preview types may be active or inactive based on the context of the user interface. For example, if the user interface is displaying email module related information, displaying the preview for email may be unnecessary and that preview may be inactivated as long as email is the main displayed module. Along the same lines, the displayed items on the navigation bar may also be modified based on the context of the user interface. Thus, the email item on the navigation bar may be replaced with another item when email is the main displayed module on the user interface.

The above described preview pane configurations are examples only and do not constitute a limitation on embodiments. A minimized or full state preview pane associated with a dynamic navigation bar according to embodiments may be provided with any configuration and combination of textual, graphic, and other items using the principles described herein. Moreover, similar configurations and presentations may be used for other modules such as email, contact, tasks, etc.

Figure 6:
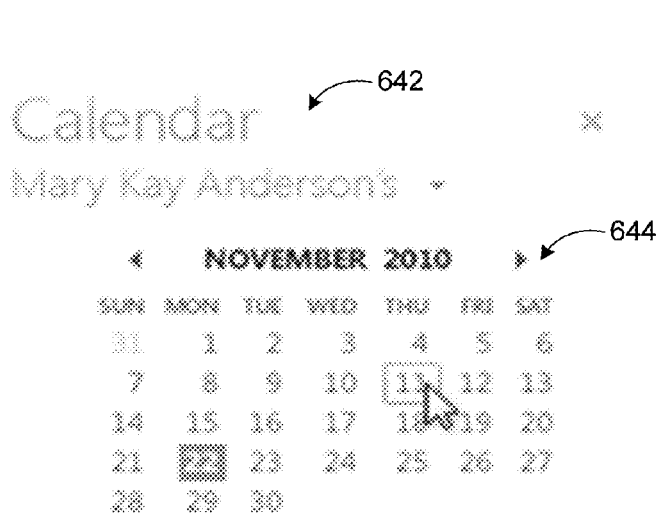
FIG. 6 illustrates two example preview panes docked together.
Figure 6:
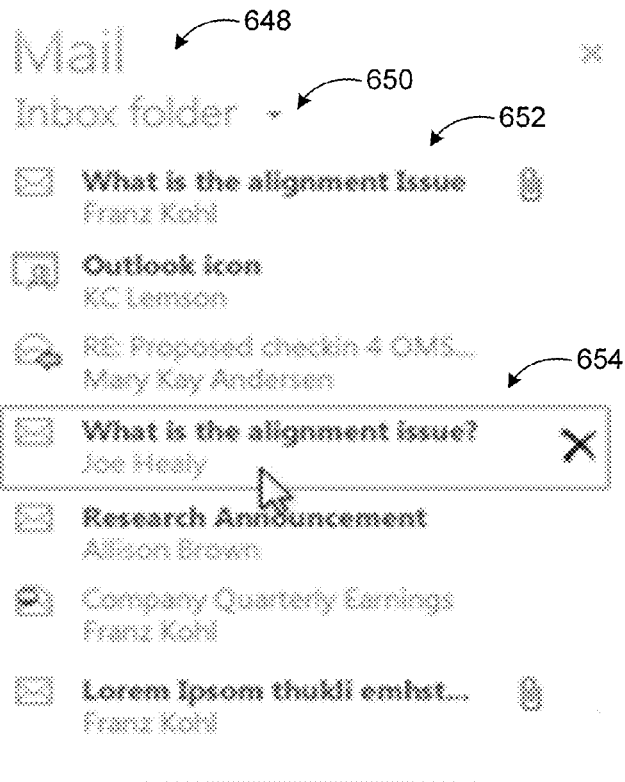

FIG. 6 illustrates two example preview panes docked together. A variety of preview panes associated with different modules supported by the communication service/application may be displayed and docked on the user interface. Diagram 600 illustrates two example preview panes, a calendar preview pane 642 and an email preview pane 648.

Calendar preview pane 642 includes a monthly calendar view 644 and a listing of upcoming calendar items 646. Email preview pane 648 includes a view of the user's inbox 659 with a listing of emails 652 identified by subject line and sender. Additional information may be provided in form of icons indicating whether an email has been responded to, forwarded, includes an attachment, etc. Upon detection of a hovering action on one of the listed emails, the email may be highlighted (654) and an option to delete (or perform other actions) may be presented to the user.

As mentioned above, preview panes provide limited interaction for the users. When a preview pane is docked, the functionality it provides may be modified according to some embodiments. For example, additional interaction capability may be provided. Furthermore, size, content, and an order of docked preview panes may be adjusted as new ones are added or existing ones undocked. Additionally, docked preview panes may be automatically undocked in response to changes in the user interface. For example, if the user interface changes to displaying the email module in the main view, the preview pane for email may no longer be needed and thus removed.

Figure 7:
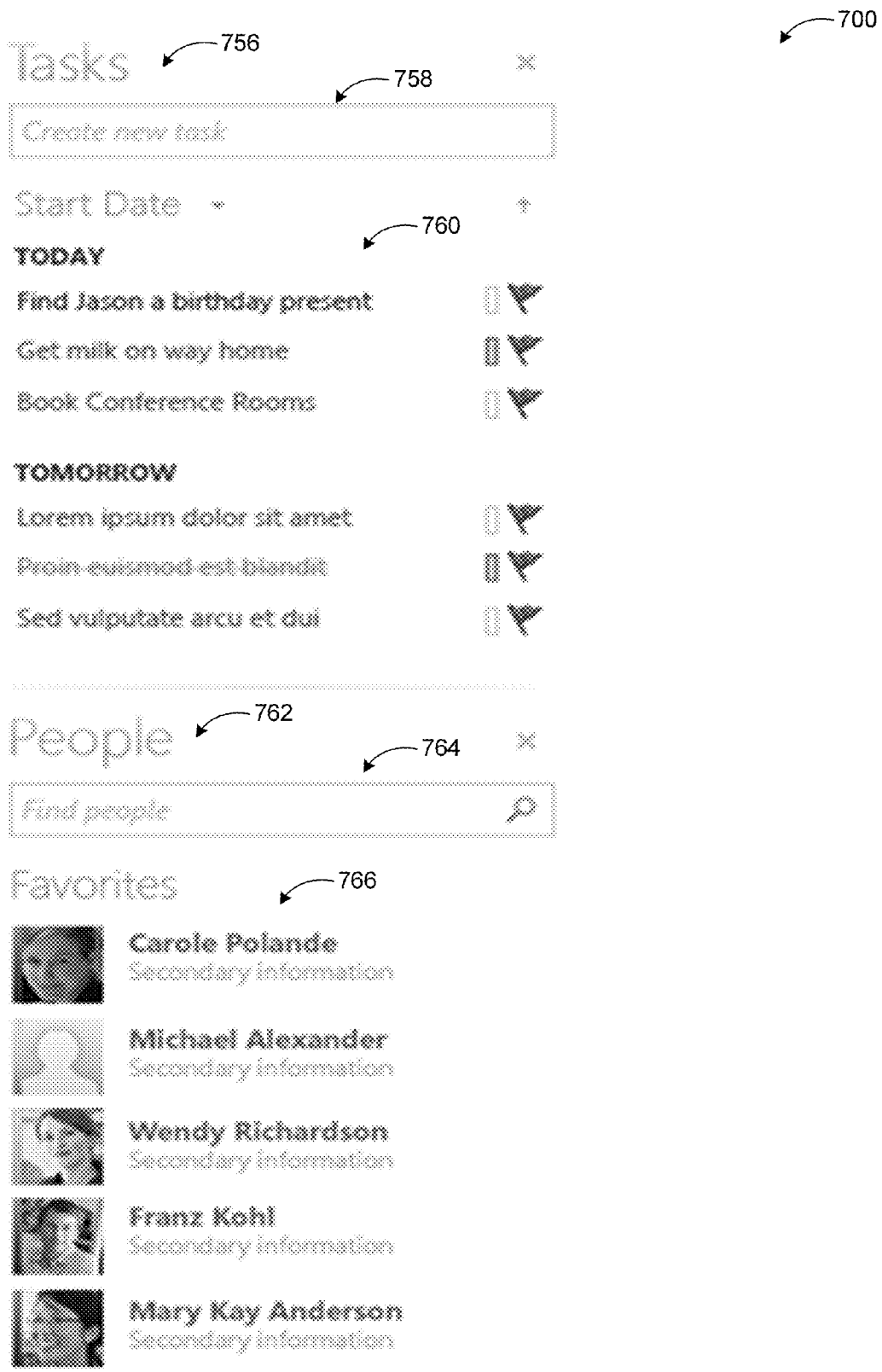
FIG. 7 illustrates two other example preview panes docked together.

FIG. 7 illustrates two other example preview panes docked together. Diagram 700 shows a tasks preview pane 756 and a contacts preview pane 762. The tasks preview pane 756 lists tasks 760 different tasks by chronology, grouped by today and tomorrow. Limited functionality such as flagging a task or changing a task's attribute (e.g., in progress, completed) may be provided along with the capability to create a new task 758.

Contacts preview pane 762 displays the user's favorite contacts 766 along with the capability to search for contacts 764. A type of items (tasks or people) to list, a categorization of the items, and the functionality provided to the user may be configurable or automatically determined.

Figure 8:
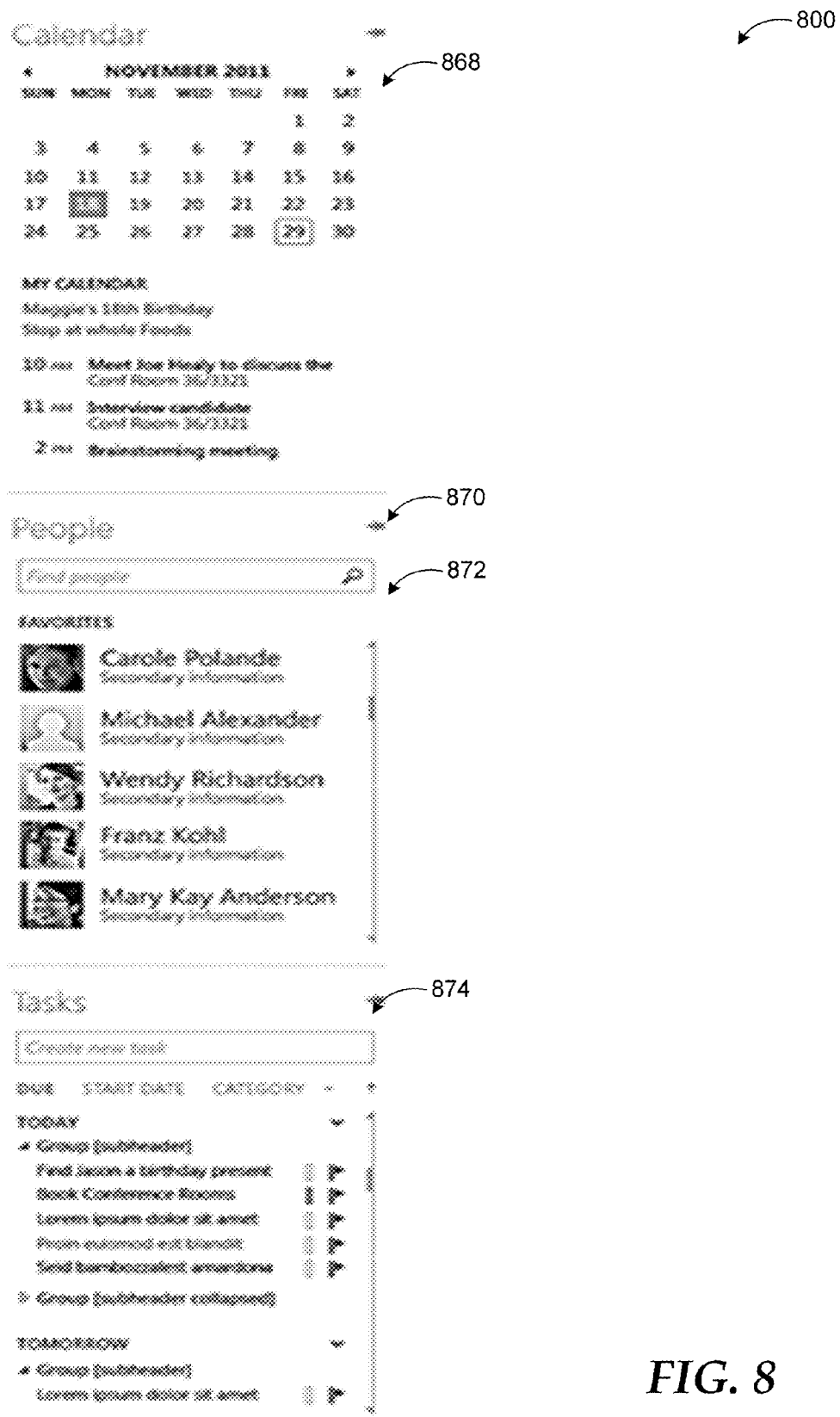
FIG. 8 illustrates three example preview panes docked together.

FIG. 8 illustrates three example previews docked together in association with a navigation bar according to embodiments. Preview panes according to embodiments may be displayed temporarily in response to a hover action on the navigation menu. According to some embodiments, one or more preview panes may also be docked or pinned to a fixed location on the user interface for permanent display. Diagram 800 illustrates a combination of three preview panes docked together.

In the example of diagram 800, a calendar preview pane 868, a contacts preview pane 872, and a tasks preview pane 874 are docked together. A docking icon 870 indicates that the preview panes are currently docked and may be used to undock (or hide) the preview panes. The location for docking the preview panes may be user selectable or dynamically determined by the program based on displayed information on the user interface and available display area. Similarly, a size and content of the docked preview panes may also be selected and modified based on the display area and context of the user interface.

According to some embodiments, the preview panes may be docked and undocked according to an animation scheme. Moreover, a color scheme, a graphical scheme, and/or a shading scheme may be employed to enhance a visual effect of the preview panes in undocked or docked form.

Figure 9:
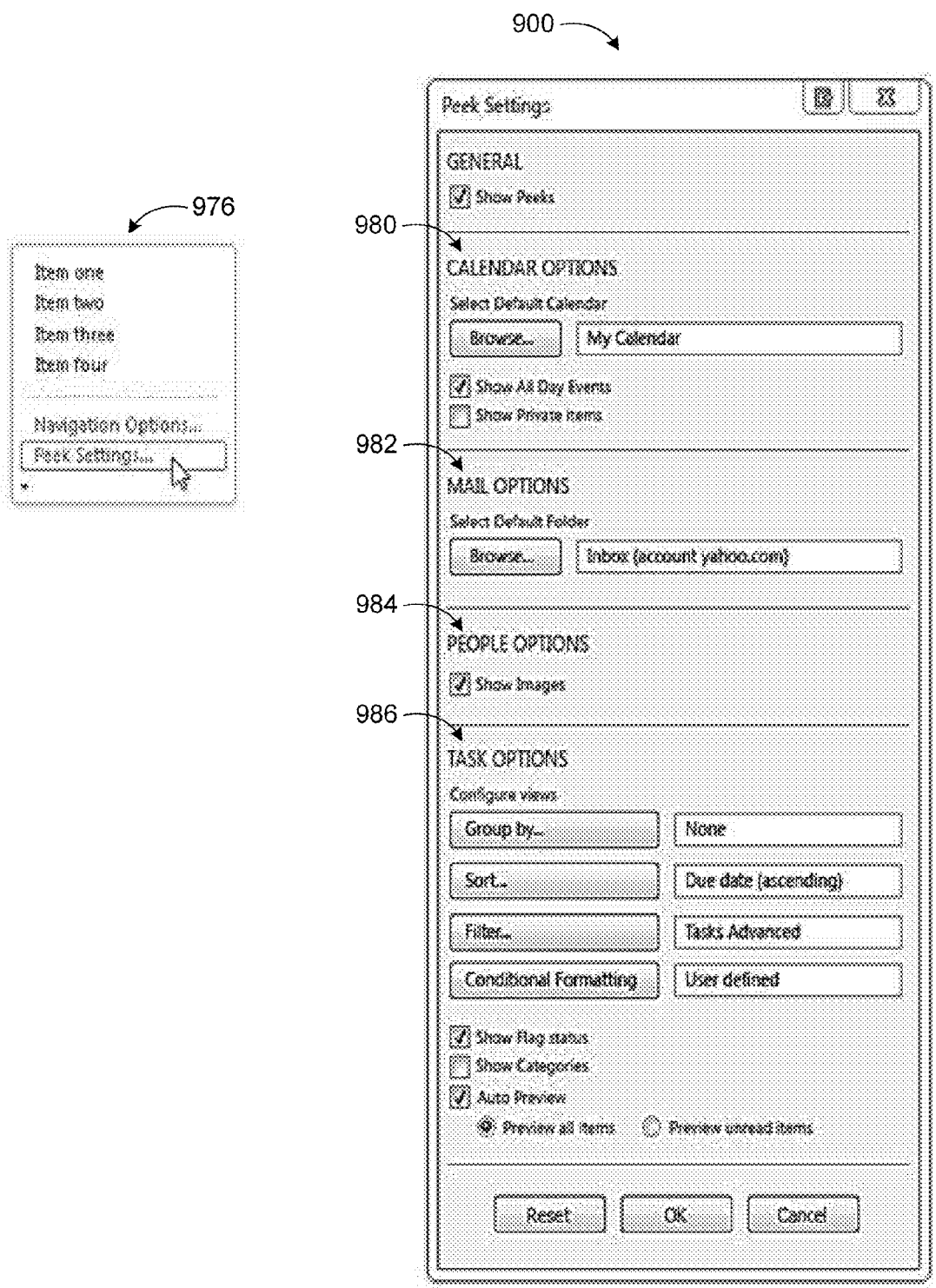
FIG. 9 illustrates a configuration menu for an example navigation bar according to embodiments.

FIG. 9 illustrates a configuration menu for an example navigation bar according to embodiments. While a navigation bar and associated preview panes may be automatically configured as discussed above, a configuration menu may also be provided for user customization.

According to some embodiments, a top level menu 976 may be provided for the user to select and customize the navigation bar itself, individual items on the navigation bar, and/or preview pane settings. The configuration menu 900 for customizing preview pane settings may include an option to activate or inactivate some or all of the preview panes. The configuration menu 900 may further include individual sections for different preview pane types such as calendar preview options 980, mail preview options 982, contacts preview options 984, and task preview options 986.

Configurable options for individual preview pane types may be determined based on application capabilities, context of the user interface, device capabilities, user credentials (e.g., permission levels), and so on. The configurable options may also be dynamically modified in response to application, computing device, display device, language or locale selection, or similar changes.

The example navigation bars, items, interactions, and configurations depicted in FIGS. 1 through 9 are provided for illustration purposes only. Embodiments are not limited to the shapes, forms, and content shown in the example diagrams, and may be implemented using other textual, graphical, and similar schemes employing the principles described herein.

Figure 10:
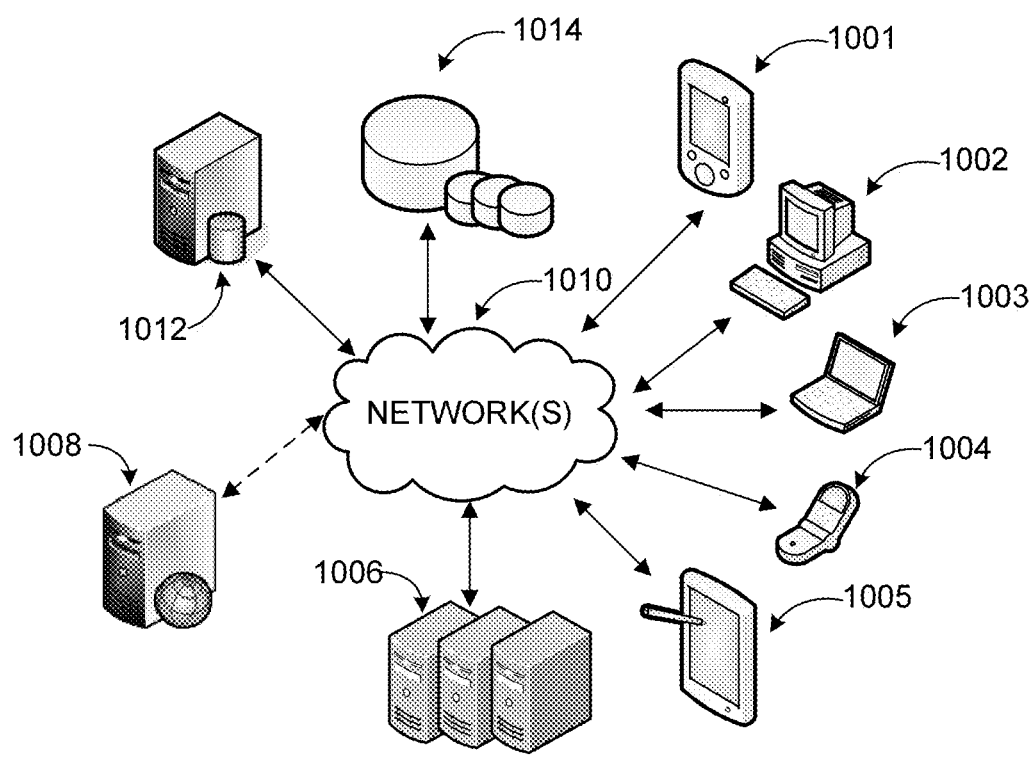
FIG. 10 is a networked environment, where a system according to embodiments may be implemented.

FIG. 10 is an example networked environment, where embodiments may be implemented. In addition to locally installed applications, such as communication application 1022 discussed below, navigation bars may also be employed in conjunction with hosted applications and services that may be implemented via software executed over one or more servers 1006 or individual server 1008. A hosted service or application may be a web-based service or application, a cloud based service or application, and similar ones, and communicate with client applications on individual computing devices such as a handheld computer 1001, a desktop computer 1002, a laptop computer 1003, a smart phone 1004, a tablet computer (or slate), 1005 (client devices') through network(s) 1010 and control a user interface presented to users. One example of a web-based service may be Outlook® by Microsoft Corporation of Redmond, WA, which provides email, text message, calendar, task management, and contact management services to clients through a browser interface on client devices. Such a service may enable users to interact with displayed content through a dynamic navigation bar and a variety of input mechanisms as discussed herein.

Client devices 1001-1005 are used to access the functionality provided by the hosted service or application. One or more of the servers 1006 or server 1008 may be used to provide a variety of services as discussed above. Relevant data may be stored in one or more data stores (e.g. data store 1014), which may be managed by any one of the servers 1006 or by database server 1012.

Network(s) 1010 may comprise any topology of servers, clients, Internet service providers, and communication media. A system according to embodiments may have a static or dynamic topology. Network(s) 1010 may include a secure network such as an enterprise network, an unsecure network such as a wireless open network, or the Internet. Network(s) 1010 may also coordinate communication over other networks such as PSTN or cellular networks. Network(s) 1010 provides communication between the nodes described herein. By way of example, and not limitation, network(s) 1010 may include wireless media such as acoustic, RF, infrared and other wireless media.

Many other configurations of computing devices, applications, data sources, and data distribution systems may be employed to provide a dynamic navigation bar in conjunction with an expanded communication service. Furthermore, the networked environments discussed in FIG. 10 are for illustration purposes only. Embodiments are not limited to the example applications, modules, or processes.

Figure 11:
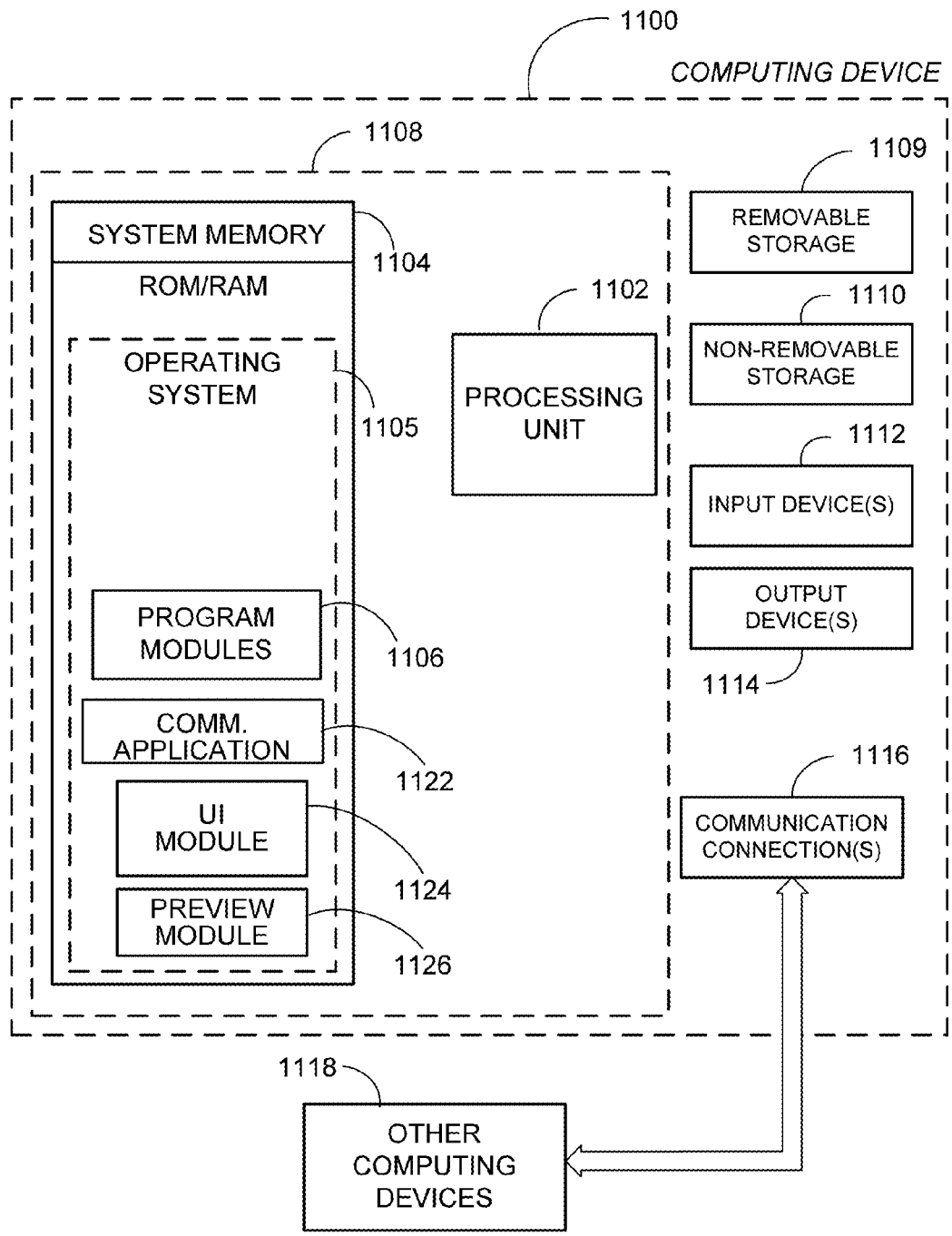
FIG. 11 is a block diagram of an example computing operating environment, where embodiments may be implemented.

FIG. 11 and the associated discussion are intended to provide a brief, general description of a suitable computing environment in which embodiments may be implemented. With reference to FIG. 11, a block diagram of an example computing operating environment for an application according to embodiments is illustrated, such as computing device 1100. In a basic configuration, computing device 1100 may be any computing device in stationary, mobile, or other form such as the example devices discussed in conjunction with FIG. 1, and include at least one processing unit 1102 and system memory 1104. Computing device 1100 may also include a plurality of processing units that cooperate in executing programs. Depending on the exact configuration and type of computing device, the system memory 1104 may be volatile (such as RAM), non-volatile (such as ROM, flash memory, etc.) or some combination of the two. System memory 1104 typically includes an operating system 1105 suitable for controlling the operation of the platform, such as the WINDOWS®, WINDOWS MOBILE®, or WINDOWS PHONE® operating systems from MICROSOFT CORPORATION of Redmond, Washington. The system memory 1104 may also include one or more software applications such as program modules 1106, communication application 1122, user interface module 1124, and preview module 1126.

User interface module 1124 may operate in conjunction with the communication application 1122 and provide a user interface enabling a user to interact with different modules of the communication application such as email, text messaging, calendar, task list, and contacts. In addition to providing separate viewing panes for the modules, menus, and textual/graphical controls, user interface module 1124 may also provide a dynamic navigation bar enabling users to switch between viewing panes of different modules while preserving valuable display area. Furthermore, preview module 1126 may enable display of preview panes for each module highlighting interesting and new activity associated with each module. The preview panes may be docked or undocked as described herein. This basic configuration is illustrated in FIG. 11 by those components within dashed line 1108.

Computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by removable storage 1109 and non-removable storage 1110. Computer readable storage media may include volatile and nonvolatile, removable and non-removable media implemented in any method or technology for storage of information, such as computer readable instructions, data structures, program modules, or other data. System memory 1104, removable storage 1109 and non-removable storage 1110 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer readable storage media may be part of computing device 1100. Computing device 1100 may also have input device(s) 1112 such as keyboard, mouse, pen, voice input device, touch input device, an optical capture device for detecting gestures, and comparable input devices. Output device(s) 1114 such as a display, speakers, printer, and other types of output devices may also be included. These devices are well known in the art and need not be discussed at length here.

Computing device 1100 may also contain communication connections 1116 that allow the device to communicate with other devices 1118, such as over a wireless network in a distributed computing environment, a satellite link, a cellular link, and comparable mechanisms. Other devices 1118 may include computer device(s) that execute communication applications, other directory or policy servers, and comparable devices. Communication connection(s) 1116 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 12:
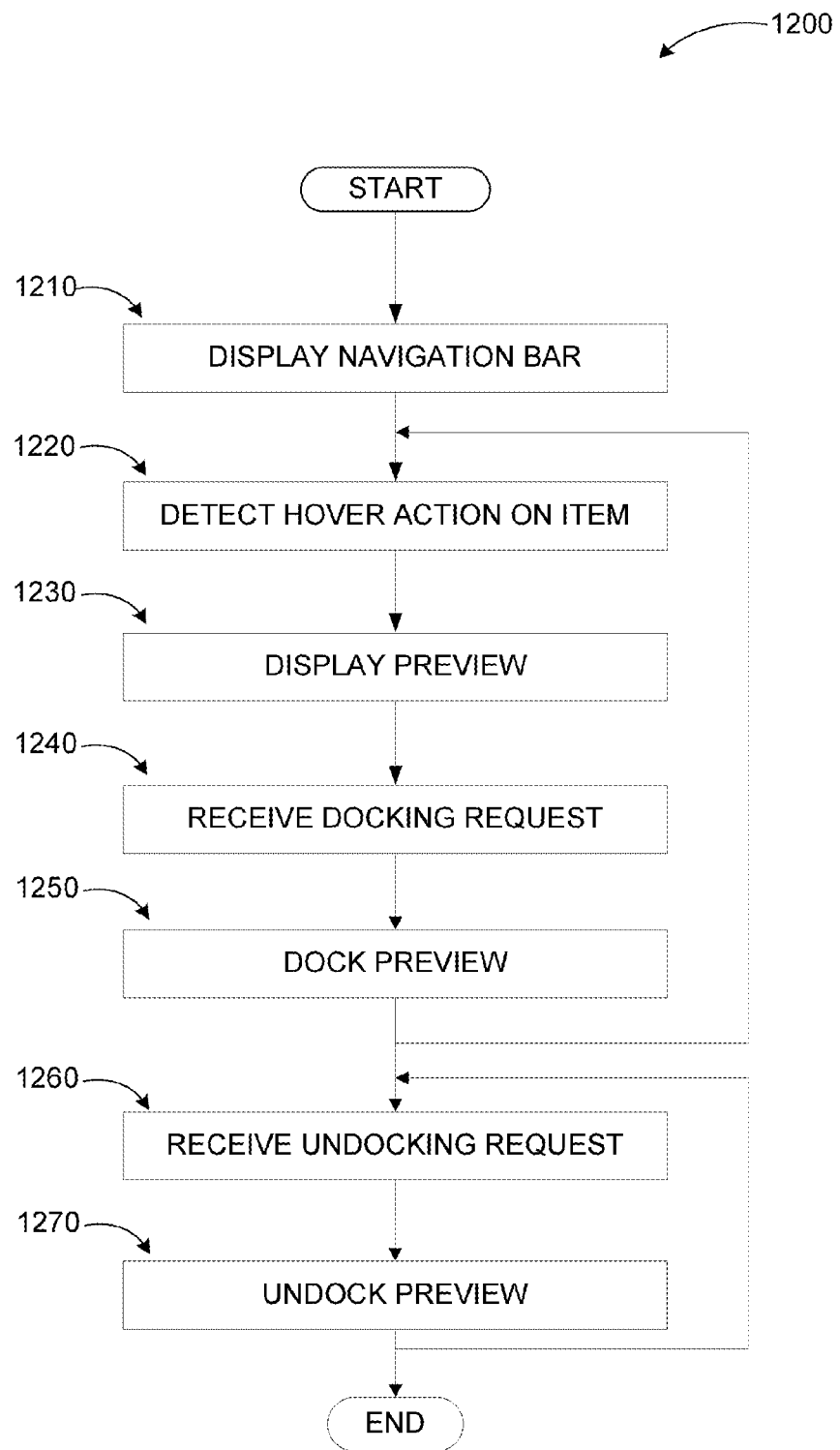
FIG. 12 illustrates a logic flow diagram for a process of providing a dynamic navigation bar with preview pane docking and undocking according to embodiments.

FIG. 12 illustrates a logic flow diagram for a process of providing a dynamic navigation bar with preview pane docking and undocking according to embodiments. Process 1200 may be implemented as part of an expanded communication service or application.

Process 1200 begins with operation 1210, where a dynamic navigation bar is displayed on a user interface of an expanded communication service or application. The navigation bar may include items presented in textual, graphic, or combination form. The navigation bar may be displayed at a suitable location on the user interface such that display area is efficiently utilized. At operation 1220, a hover action or similar indication of interest by the user on one of the items of the navigation bar may be detected followed by displaying an associated preview temporarily at operation 1230.

At operation 1240, a docking request may be received for a displayed preview pane, for example activation of a control element for docking At operation 1250, the displayed preview pane may be docked at a user defined or dynamically selected location on the user interface. Temporary display of preview panes in response to hover action and docking of displayed preview panes may be iterative such that multiple preview panes can be docked.

At operation 1260, an undocking request may be received through the same control element or another control element that is activated on a docked preview pane. The docked preview pane for which the request for undocking is received may be undocked and hidden at operation 1270. Operations 1260 and 1270 may be iterative, where a user can undock one or more (or all) docked preview panes.

The operations included in process 1200 are for illustration purposes. Providing a dynamic navigation bar for an expanded communication service with preview docking and undocking according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing a dynamic navigation bar with preview docking and undocking capability within an expanded communication application, the method comprising:
    displaying the navigation bar comprising a plurality of items representing individual modules of the communication application within a user interface of the communication application;
    in response to detecting a hover action on a navigation bar item:
        determining whether a preview pane associated with a module represented by the navigation bar item is active based on a context of a current view of the user interface, wherein the preview pane is active when another module represented by another navigation bar item is displayed in the current view of the user interface;
        in response to a determination that the preview pane is active, temporarily displaying the preview pane presenting content associated with the module simultaneously with the current view of the user interface presenting content associated with the other module, wherein a format of the preview pane and the current view are distinct; and
        enabling interaction with the presented content associated with the module through the temporarily displayed preview pane, wherein the presented content associated with the module comprises one or more items, and the interaction includes one of opening, marking, and deleting the one or more items, and creating new items;
    in response to receiving a docking request, docking the preview pane to one of a predefined and dynamically determined location on the user interface for permanent display; and
    automatically undock the preview pane from the user interface in response to a detection that the module is displayed in the current view of the user interface.

2. The method of claim 1,
    wherein at least one from a set of: an extent of the interaction, the presented content, a layout of the presented content, and a format of the presented content are configurable by the user.

3. The method of claim 2, wherein at least one from a set of: an extent of the interaction, the presented content, a layout of the presented content, and a format of the presented content are automatically determined based on one or more of a machine learning process analyzing user behavior and information received from another application.

4. The method of claim 1, further comprising:
    enabling inactivation of one or more preview panes associated with one or more navigation bar items.

5. The method of claim 1, further comprising:
    automatically inactivating a preview pane associated with a module that is displayed in the current view on the user interface.

6. The method of claim 1, further comprising:
    dynamically determining the location for docking the preview pane based on at least one from a set of: a currently displayed module, an available display area, a displayed content on the user interface, an application type, a device type, and the user credential.

7. The method of claim 1, further comprising:
    enabling docking of a plurality of preview panes.

8. The method of claim 7, further comprising:
    adjusting at least one from a set of: a size, a layout, a location, and content of the docked preview panes in response to one of: docking a new preview pane and undocking an existing preview pane.

9. The method of claim 1, further comprising at least one from a set of:
    displaying, hiding, docking, and undocking the preview pane in an animated manner.

10. The method of claim 1, further comprising:
    enabling display of additional content on the preview pane through a scroll function.

11. The method of claim 1, wherein at least one from a set of: a size, a layout, a location, and content of the preview pane is one of: dynamically adjustable, fixed, and user configurable.

12. A computing device for providing an expanded communication application with a dynamic navigation bar capable of docking and undocking preview panes, the computing device comprising:
    an input device;
    a memory;
    at least one processor coupled to the memory and the input device, the at least, one processor executing the communication application and causing a user interface associated with the communication application to be displayed on a screen, wherein the at least one processor is configured to;
    display the navigation bar comprising a plurality of items representing individual modules of the communication application within the user interface of the communication application, wherein the modules are associated with at least one from a set of: email exchange, scheduling, text messaging, contact management, and task management;
    in response to detecting a hover action on a navigation bar item:
        determine whether a preview pane associated with a module represented by the navigation bar item is active based on a context, of a current view of the user interface, wherein the preview pane is active when another module represented by another navigation bar item is displayed in the current view of the user interface; and
        in response to a determination that the preview pane is active, temporarily display the preview pane presenting content associated with the module simultaneously with a current view of the user interface presenting content associated with the other module;
        in response to receiving a docking request, dock the preview pane to one of a predefined and dynamically determined location on the user interface for permanent display; and
    automatically undock the preview pane from the user interface in response to a detection that the module is displayed in the current view of the user interface.

13. The computing device of claim 12, wherein the at least one processor is further configured to:
    adjust at least one from a set of: a size, a layout, a location, and content of the preview pane in response to docking the preview pane.

14. The computing device of claim 12, wherein the at least one processor is further configured to:

enable manual adjustment of the location of the docked preview pane.

15. The computing device of claim 12, wherein the at least one processor is further configured to:
   enable docking of the preview pane through activation of a first control element presented on the temporarily displayed preview pane.

16. The computing device of claim 15, wherein undocking of a docked preview pane is enabled through activation of one of the first control element and a second control element presented on the docked preview pane.

17. The computing device of claim 12, wherein the communication application is provided as one of a web-based application in server-client architecture, a cloud-based hosted application, and a locally installed application, and the computing device is one of a stationary computer, a laptop computer, a vehicle-mount computer, a handheld computer, a consumer electronic device, a personal digital assistant (PDA), a smartphone, a hand-held game console, and a computer peripheral.

18. A computer-readable memory device with instructions stored thereon for providing a dynamic navigation bar with preview docking and undocking capability within an expanded communication application, the instructions containing:
   displaying the navigation bar comprising a plurality of items representing individual modules of the communication application within a user interface of the communication application, wherein the items in the navigation bar include one or more of: text, graphics, images, and a combination of text and graphics;
   in response to detecting a hover action on a navigation bar item:
   determining whether a preview pane associated with a module represented by the navigation bar item is active based on a context of a current view of the user interface, wherein the preview pane is active when another module represented by another navigation bar item is displayed in the current view of the user interface;
   in response to a determination that the preview pane is active, temporarily displaying the preview pane presenting content associated with the module simultaneously with the current view of the user interface presenting content associated with the other module, wherein a format of the preview pane and the current view are distinct; and
      enabling interaction with the presented content associated with the module through the temporarily displayed preview pane, wherein the presented content associated with the module comprises one or more and the interaction includes one of opening, marking, and deleting the one or more Items, and creating new Items;
   in response to receiving a docking request docking the preview pane to one of a predefined and dynamically determined location on the user interface for permanent display;
   automatically undocking the preview pane from the user interface in response to a detection that the module is displayed in the current view of the user interface: and
   in response to detecting selection of the navigation bar item, modifying the user interface to display the module represented by the navigation bar item in the current view of the user interface.

19. The computer-readable memory device of claim 18, wherein the instructions further comprise:
   employing, one or more of a layout scheme, a color scheme, a shading scheme, a textual scheme, a graphics scheme, and an animation scheme in conjunction with displaying and docking the preview pane such that a consistency of look and feel is provided across different applications and devices associated with a user.

* * * * *